(12) United States Patent
Boyer (10) Patent No.: US 9,791,098 B2
(45) Date of Patent: Oct. 17, 2017

(54) REMOVABLE MOBILE DEVICE HOLDER CLIP

(71) Applicant: William J. Boyer, Lakewood, WA (US)

(72) Inventor: William J. Boyer, Lakewood, WA (US)

( * ) Notice: Subject to any disclaimer, the term of this patent is extended or adjusted under 35 U.S.C. 154(b) by 3 days.

(21) Appl. No.: 15/097,098

(22) Filed: Apr. 12, 2016

(65) Prior Publication Data

US 2016/0298808 A1  Oct. 13, 2016

Related U.S. Application Data

(60) Provisional application No. 62/146,893, filed on Apr. 13, 2015, provisional application No. 62/235,744, filed on Oct. 1, 2015.

(51) Int. Cl.

| *F16M 13/02* | (2006.01) |
|---|---|
| *A45F 5/00* | (2006.01) |
| *B64D 11/00* | (2006.01) |
| *B64D 11/06* | (2006.01) |
| *F16M 11/10* | (2006.01) |
| *F16M 11/20* | (2006.01) |

(52) U.S. Cl.
CPC ............ *F16M 13/022* (2013.01); *A45F 5/00* (2013.01); *B64D 11/00152* (2014.12); *B64D 11/0638* (2014.12); *F16M 11/10* (2013.01); *F16M 11/2014* (2013.01); *A45F 2200/0516* (2013.01); *A45F 2200/0525* (2013.01)

(58) Field of Classification Search
CPC .. F16M 13/022; F16M 11/10; F16M 11/2014; F16M 13/00; F16M 11/041; B62J 11/00; B64D 11/00152; B64D 11/0638; A45F 5/00; A45F 2200/0516; A45F 2200/0525
See application file for complete search history.

(56) References Cited

U.S. PATENT DOCUMENTS

| 6,409,137 | B1 * | 6/2002 | Tran ......................... A47C 7/68 |
|---|---|---|---|
| | | | 206/549 |
| 2005/0145757 | A1 * | 7/2005 | Brown ................... B44D 3/123 |
| | | | 248/110 |
| 2009/0189039 | A1 * | 7/2009 | Labuda .................. F16M 11/40 |
| | | | 248/231.81 |
| 2012/0026684 | A1 * | 2/2012 | Matthews ............ F16M 11/041 |
| | | | 361/679.58 |

(Continued)

*Primary Examiner* — Corey Skurdal
(74) *Attorney, Agent, or Firm* — George C. Rondeau, Jr.; Davis Wright Tremaine LLP (57) ABSTRACT

A holding clip apparatus is provided for attaching a mobile electronic device to a tray table of a commercial vehicle, such as a train or airliner. A tray table attachment section of the holding clip apparatus includes an upper support member and a lower support member each extending outwardly in a horizontal direction from a rear support wall. A mobile device holding section of the holding clip apparatus includes a front support wall and a rear support wall extending upwardly from a base portion having a bottom surface. Attachment portions may be provided connecting the tray table attachment section and the mobile device holding section. A mobile device angle adjustment section may be provided that allows the mobile device holding section to rotate to adjust the viewing angle of a mobile device held thereto.

24 Claims, 11 Drawing Sheets

(56) References Cited

U.S. PATENT DOCUMENTS

| | | | |
|---|---|---|---|
| 2013/0105650 A1* | 5/2013 | Cohen | A47G 23/0225 |
| | | | 248/229.26 |
| 2013/0199963 A1* | 8/2013 | Garfinkle | A47F 3/14 |
| | | | 206/557 |
| 2014/0048662 A1* | 2/2014 | Ferris | F16M 13/02 |
| | | | 248/205.1 |
| 2014/0077056 A1* | 3/2014 | Ghosh | F16M 11/041 |
| | | | 248/690 |
| 2016/0257404 A1* | 9/2016 | Ferris | B64D 11/00152 |

* cited by examiner

REMOVABLE MOBILE DEVICE HOLDER CLIP

CROSS-REFERENCE

The current application claims priority to U.S. Patent Application No. 62/146,893, filed Apr. 13, 2015, and to U.S. Patent Application No. 62/235,744, filed Oct. 1, 2015, the entirety of which are hereby incorporated by reference.

FIELD OF THE INVENTION

The present invention is directed to a removable mobile device holder clip that may be attached to tray tables such as commercial aircraft tray tables.

BACKGROUND

Recently, commercial aircraft have been providing in-flight entertainment (IFE) systems for passengers. However, passengers sometimes wish to use their own mobile electronic devices, such as tablet computers, e-readers and smartphones, for their inflight for entertainment and other reasons. In the past when using a tablet computer inflight, passengers would either hold the computer with their hands, position the computer on their laps or place the computer on the airplane tray table and prop it up against the back of the seat to which the meal tray is attached. None of these approaches are convenient, especially for long term use such as watching a movie during the flight. Further, these approaches do not allow for securely fixing the position of the computer or adjustment of the viewing angle of the computer screen.

DETAILED DESCRIPTION OF THE INVENTION

Figure 1:
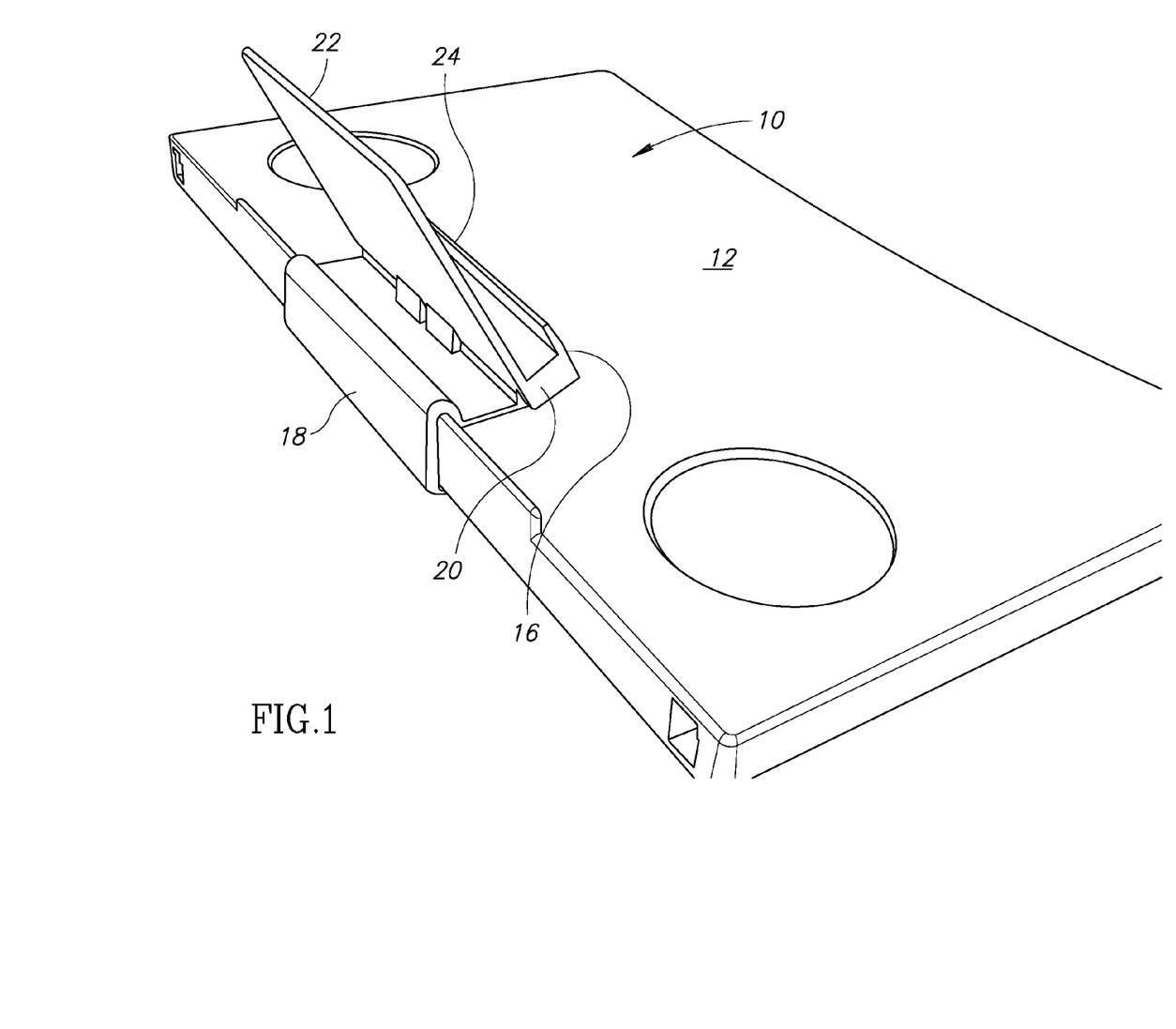
FIG. 1 illustrates a rear perspective view of a removable mobile device holder clip according to a first embodiment removably clipped to a conventional aircraft tray table.

A removable table computer holder clip 10 is provided for use with a table 12 such as an aircraft tray table, as shown in FIG. 1, to support a tablet computer 14 or other mobile device such as a smartphone or an e-reader. The holder clip 10 includes a base portion 16 and a clip portion 18 positioned therebelow which may be clipped to an edge of the table 12, such as a tray table of an aircraft, train, or the like or any other table or item.

Figure 2:
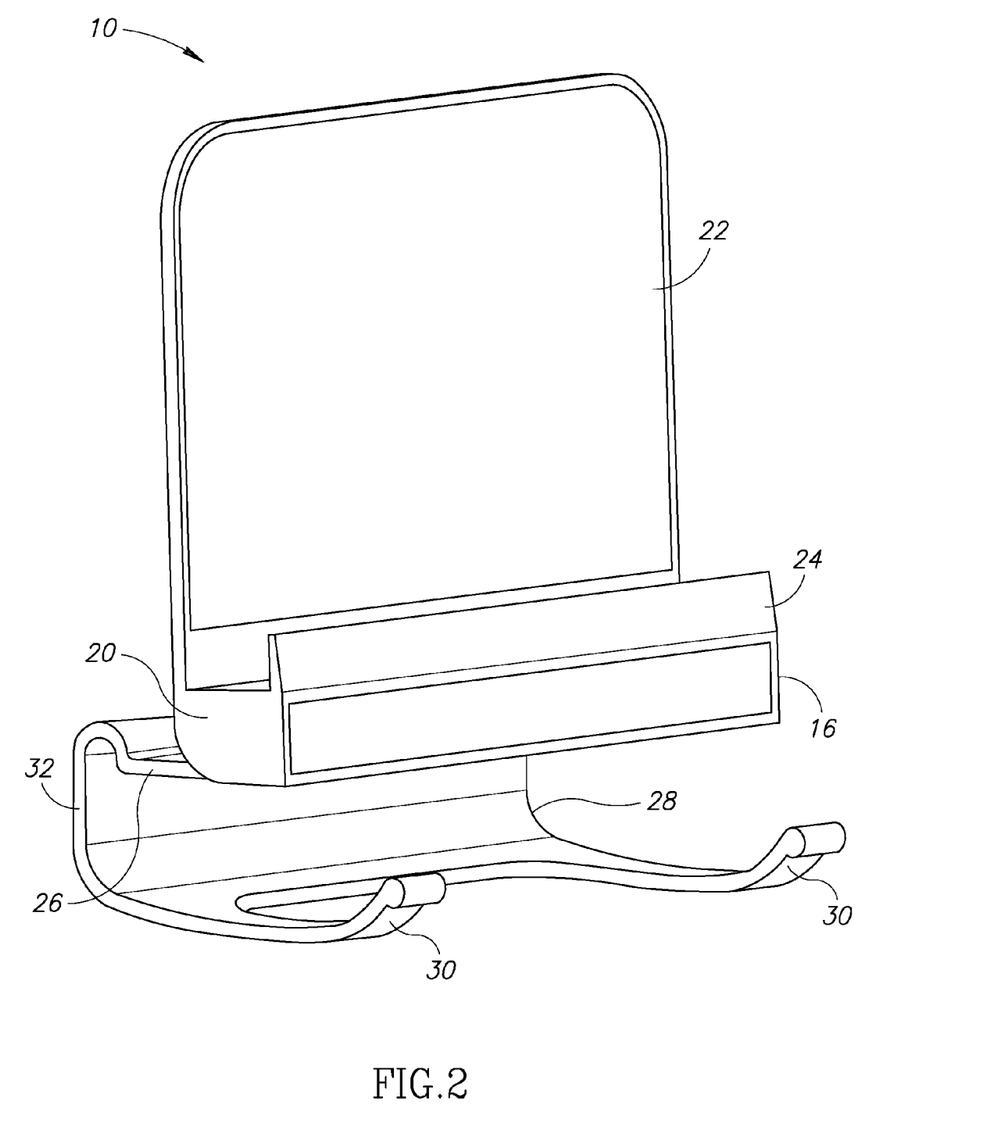
FIG. 2 illustrates a front view of the removable mobile device holder clip of FIG. 1.
Figure 3:
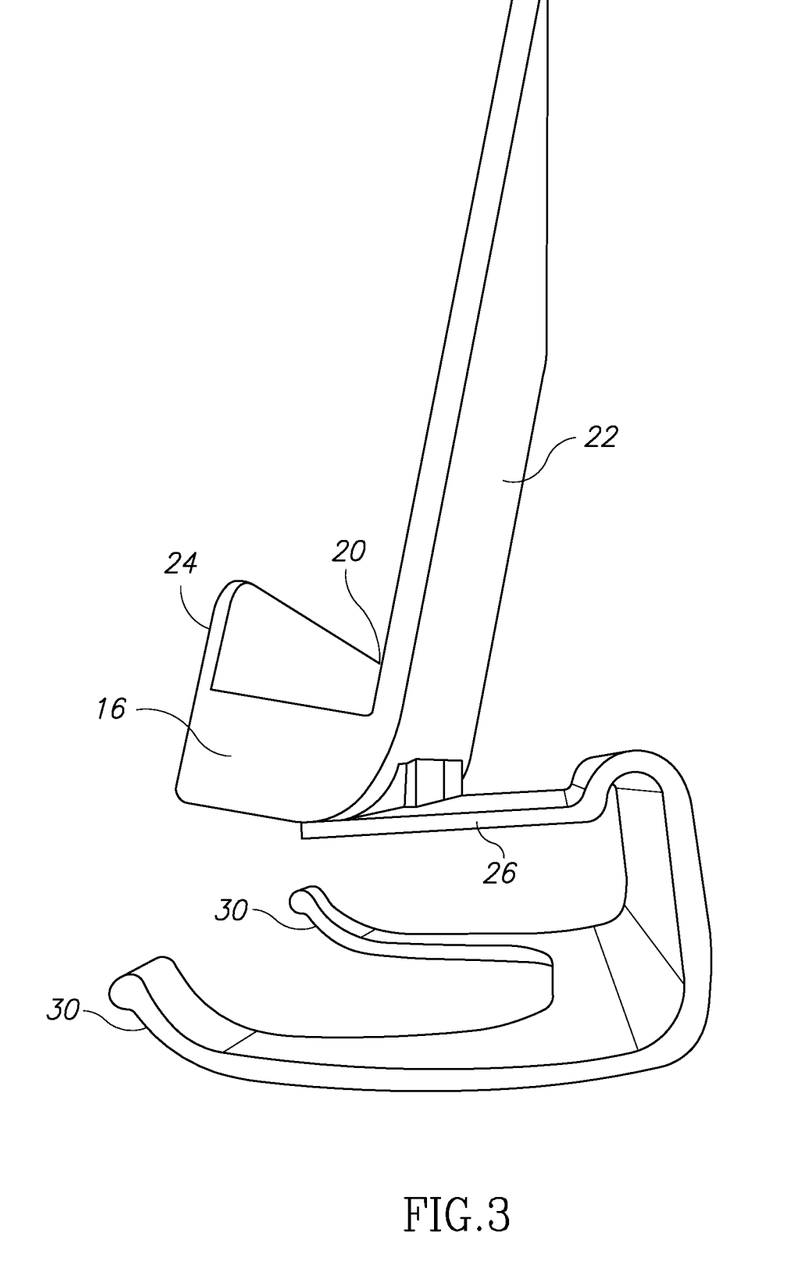
FIG. 3 illustrates a right side view of the mobile device holder clip of FIG. 1.

As shown in FIGS. 2 and 3, the base portion 16 of the holder clip 10 includes a support tray 20 upon which an edge of the tablet computer 14 rests, a planar back support member 22 extending upwardly from a rearward edge portion of the support tray and against which the tablet computer leans, and a front stop wall 24 which extends upwardly from a forward edge portion of the support tray sufficiently to limit forward movement of the portion of the table computer being supported by the support tray.

As also shown in FIGS. 2 and 3, the clip portion 18 of the holder clip 10 has an upper member 26 to which the base portion 16 is pivotally attached, and a lower member 28 with two forwardly projecting spring arms 30 spaced apart in a horizontal direction. A rear wall member 32 extends between a rearward edge portion of the upper member 26 and a rearward edge portion of the lower member 28, and connects the upper member and lower member together at a rear side of the clip portion 18. The rear wall member 32 has a height sized to accommodate the height of the edge portion of the table 12 when the holder clip 10 is clipped onto the edge portion of the table, with the upper member 26 positioned at the upper surface of the table and the lower member 28 positioned at the lower surface of the table. The sizing and resiliency of the clip portion 18, and particularly the rear wall member 32 and the lower member 28 and its two spring arms 30, are selected so that when in clipped to the edge portion of the table 12, the holder clip 10 is securely held in place by the clip portion, but yet is removable from the connection to the table without use of tools. The clip portion 18 may elastically bend or deform to clip to the table 12. Once clipped onto the table 12, the clip portion 18 may inwardly compress the lower member 28 and/or the upper member 26 against opposite surfaces of the table to retain the holder clip 10 thereto.

The base portion 16 of the holder clip 10 may be pivotally attached to the upper member 26 of the clip portion 18. The pivotal connection may be accomplished with two metal hinges 34, shown in FIG. 14, and shown installed in FIG. 6. For ease of description, the one hinge is identified as 34(A) and the other as 34(B) in the drawings. Each of the hinges 34 has an elongated central barrel member 36 having a longitudinal axis with a first connector member 38 at one end projecting outward in coaxial alignment with the barrel member and a second connector member 40 at the opposite end projecting outward in coaxial alignment with the barrel member. The barrel member 36 is constructed to permit at least limited rotation of the first and second connector members 38 and 40 about the longitudinal axis of the barrel member. The barrel member 36 is constructed to provide a resistance preventing rotation of the first and second connector member 38 and 40 unless a sufficient rotational force is applied thereto. Alternatively, other pivotal connection mechanisms than a hinge may be used to pivotally attach the upper member 26 to the base portion 16, such as a ball-and-socket joint, by way of non-limiting example.

Each of the first and second connector members 38 and 40 of each of the hinges 34 has a pair of apertures 42. Each aperture 42 is sized to allow projection of a fastener 44, such as a screw, therethrough for attachment of the first and second connector members 38 and 40 to the base portion 16 and the upper member 26 of the clip portion 18. The first and second connector members 38 and 40 are shown fastened to the base portion 16 and the upper member 26 of the clip portion 18 in FIG. 6.

Figure 4:
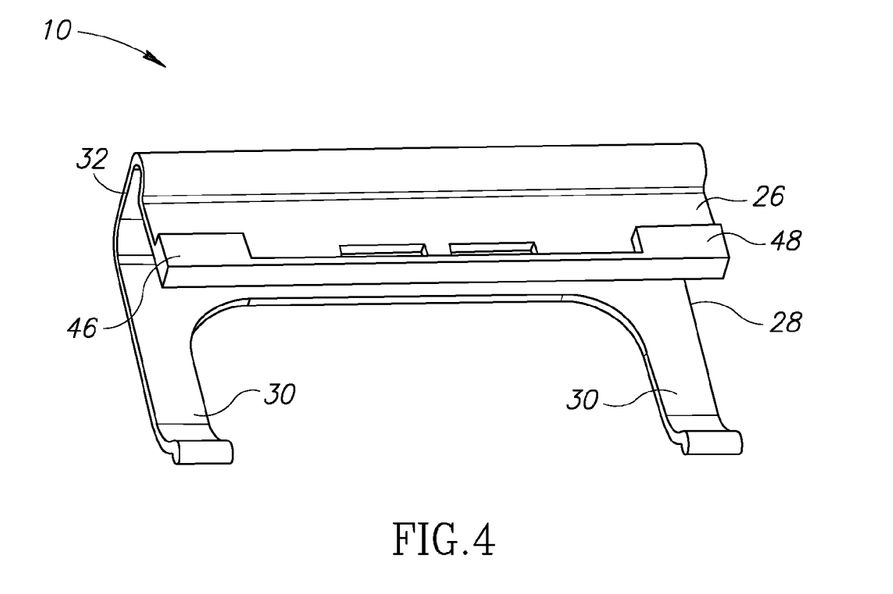
FIG. 4 illustrates a top perspective view of a clip lower portion of the mobile device holder clip of FIG. 1.
Figure 5:
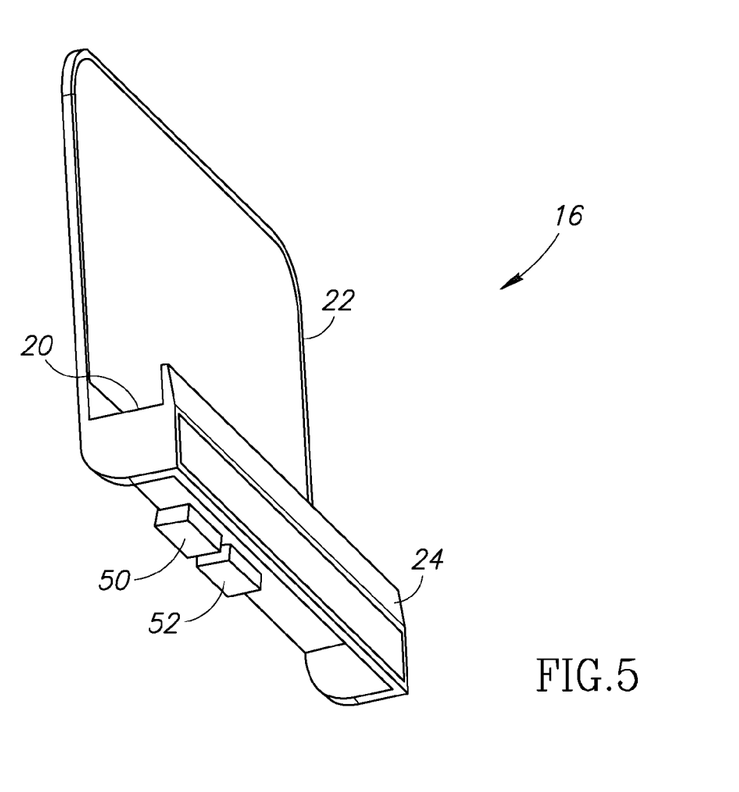
FIG. 5 illustrates a bottom perspective view of a support tray upper portion of the mobile device holder clip of FIG. 1.
Figure 6:
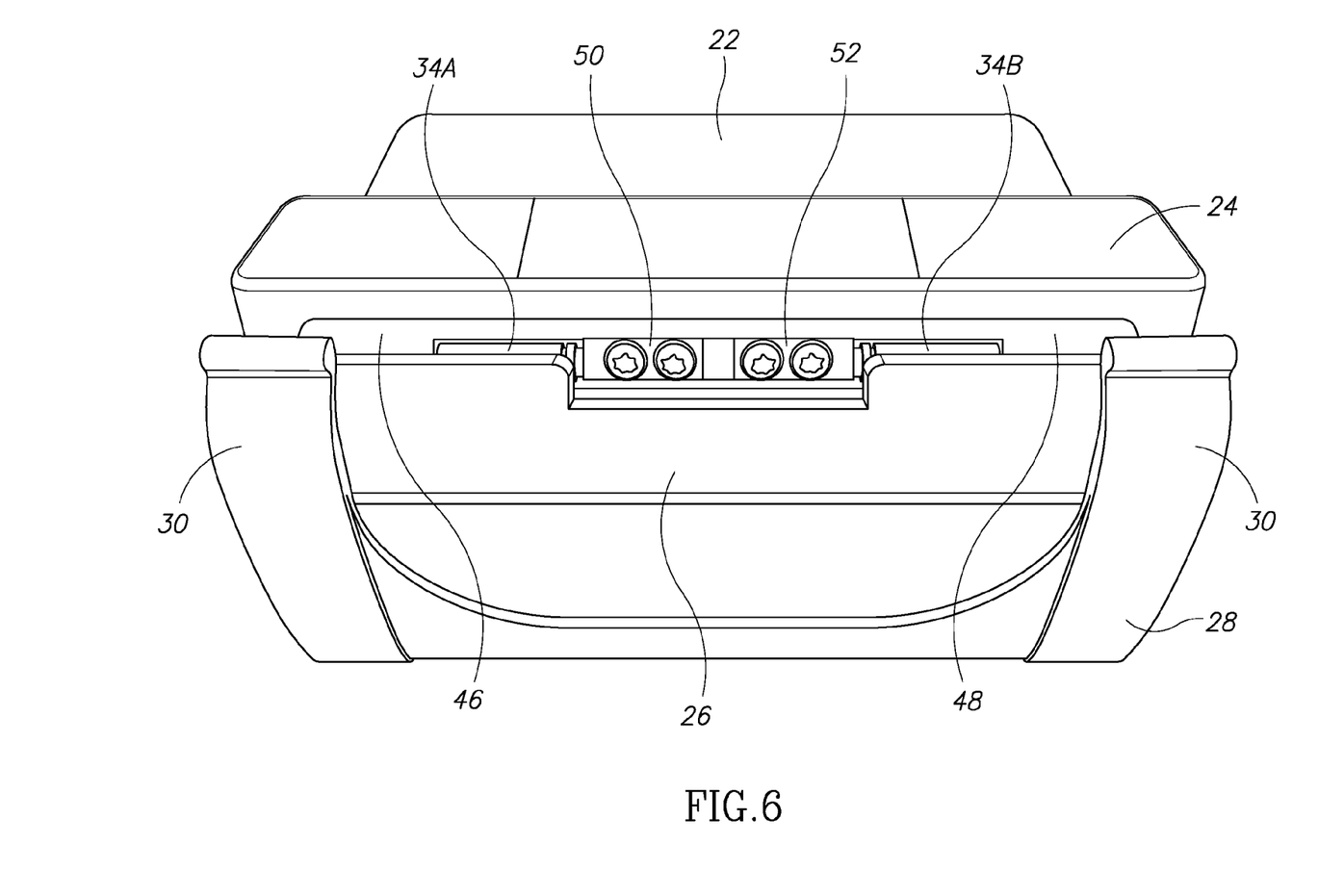
FIG. 6 illustrates a bottom view of the mobile device holder clip of FIG. 1 with the support tray rotated backwards.

As best seen in FIGS. 4 and 6, the upper member 26 of the clip portion 18 includes left and right end portion pads 46 and 48 in its upper surface, located toward a forward edge of the upper member, sized to have the first connector member 38 of the one hinge 34(a) and the second connector member 40 of the other hinge 34(B), respectively, attached thereto. As best seen in FIGS. 5 and 6, the lower surface of the base portion 16 includes left and right central portion pads 50 and 52, located toward a rearward edge of the base portion, sized to have the second connector member 40 of the one hinge 34(A) and the first connector member 38 of the other hinge 34(B), respectively, attached thereto. The first connector member 38 and the second connector member 40 are each attached to a corresponding portion (i.e., pads 46, 48, 50, 52) using two of the fastener 44.

The left and right end portion pads 46 and 48 of the clip portion 18 are more clearly shown in the illustration of the clip portion of FIG. 4, and the left and right central portion pads 50 and 52 of the base portion 16 are more clearly shown in the illustration of the base portion of FIG. 5. An illustration of the fully assembled holder clip 10 is shown in FIG. 6.

Each of the hinges 34 is constructed to permit at least limited rotation of the first and second connector members 38 and 40 about the longitudinal axis of the barrel member 36, but is constructed to resist such rotation of the first and second connector member 38 and 40 unless a sufficient rotational force is applied thereto. The cumulative resistance of the hinges 34(A) and 34(B) is selected to prevent the base portion 16 from rotating relative to the clip portion 18 of the holder clip 10 when in use supporting the weight of the tablet computer 14, but yet a low enough resistance that a user may rotate the base portion 16 relative to the clip portion 18 to adjust the angle of the back support member 22 to a desired viewing angle for the user when the clip portion is clipped to the table 12.

Figure 7:
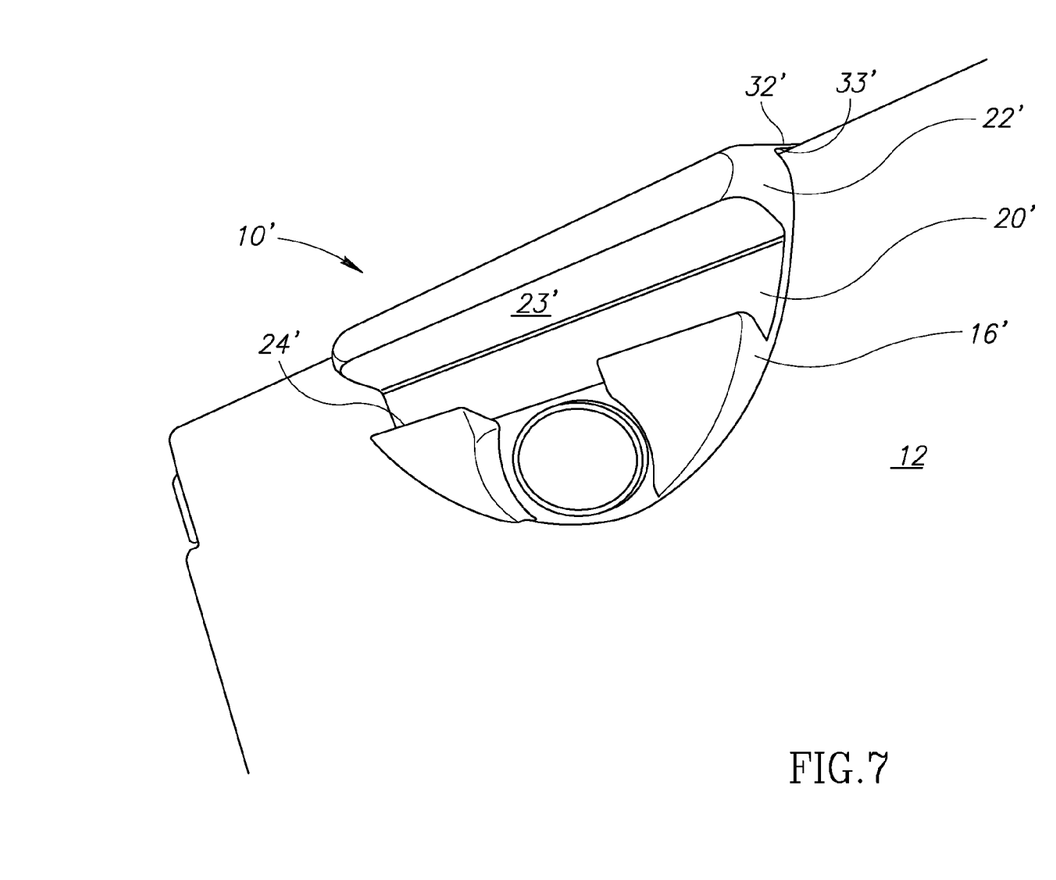
FIG. 7 illustrates a top perspective view of a removable mobile device holder clip according to a second embodiment removably clipped to a conventional aircraft tray table.
Figure 8:
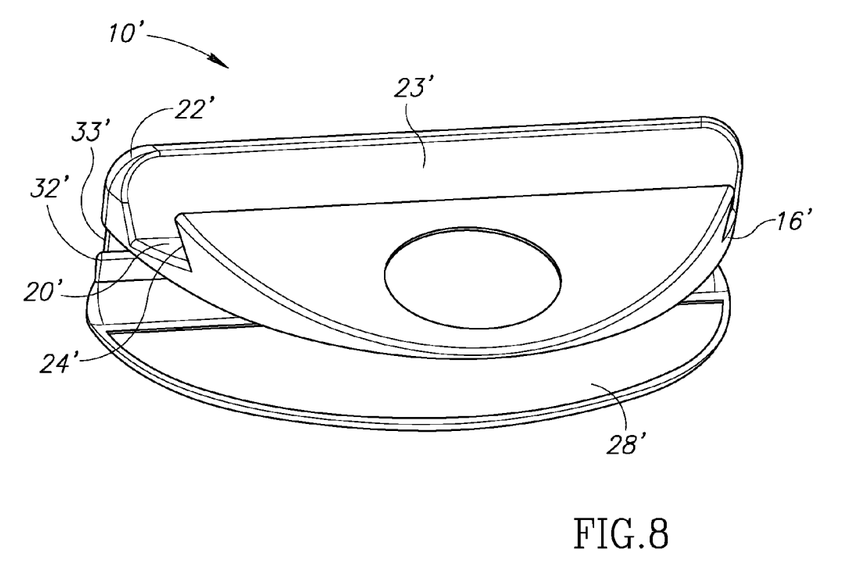
FIG. 8 illustrates a front perspective view of the mobile device holder clip of FIG. 7.
Figure 9:
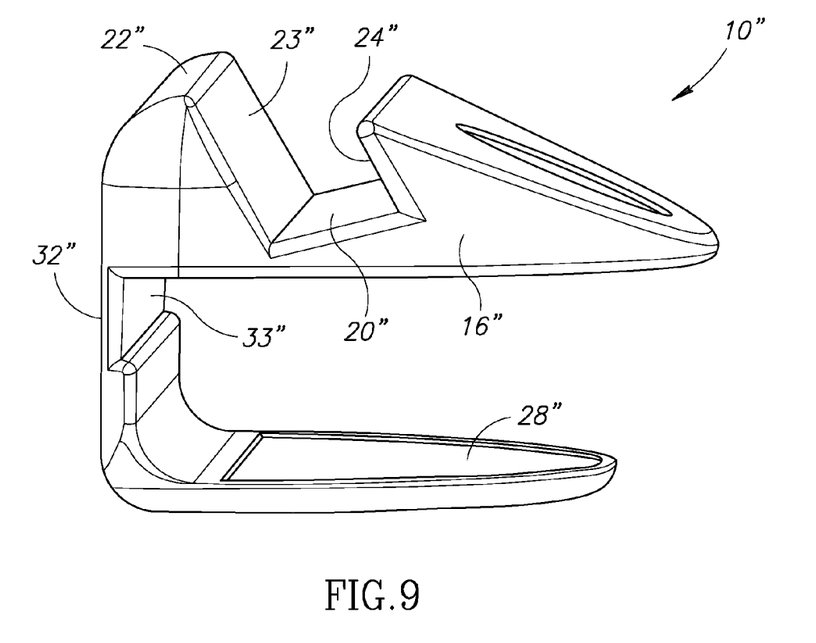
FIG. 9 illustrates a left side view of the mobile device holder clip of FIG. 7.

FIGS. 7, 8 and 9 show a first alternative embodiment of a removable table computer holder clip 10' that may be used with a conventional table 12 such as an aircraft tray table. A base portion 16' of the holder clip 10' includes a support tray 20' upon which an edge of the tablet computer 14 rests, a back support member 22' with a planar forward surface 23' which extends upwardly from a rearward edge portion of the support tray and against which the tablet computer leans, and a front stop wall 24' extending upwardly from a forward edge portion of the support tray sufficiently to limit forward movement of the portion of the table computer being supported by the support tray. The planar forward surface 23' and/or the front stop wall 24' may angled rearwardly toward a rear side of the base portion 16' at an acute angle with respect to a lower surface of the base portion.

As shown in FIG. 9, the clip portion of the holder clip 10' is formed by a lower surface of the base portion 16' and a lower member 28' connected together by a rear wall member 32' extending between a rearward edge portion of the base portion 16' and a rearward edge portion of the lower member 28'. In the embodiment of FIGS. 7-9, the back support member 22' is rigidly connected to the base portion 16' and does not pivot relative to the base portion. The rear wall member 32' has a height sized to accommodate the height of the edge portion of the table 12 when the holder clip 10' is clipped onto the edge portion of the table, with the lower surface of the base portion 16' positioned at the upper surface of the table and the lower member 28' positioned at the lower surface of the table. The sizing and resiliency of a thinner portion 33' of the rear wall member 32' are selected so that when in clipped to the edge portion of the table 12, the holder clip 10' is securely held in place, but yet is removable from the connection to the table without use of tools. A friction fit is provided sufficient to hold the holder clip 10' in place on the table 12 during normal usage. Specifically, the clip portion 18' may elastically bend or deform to clip to the table 12. Once clipped onto the table 12, the clip portion 18' may inwardly compress the lower member 28' and/or the upper member 26' against opposite surfaces of the table to retain the holder clip 10' thereto. Different spacing between the lower surface of the base portion 16' and the lower member 28' may be provided to securely hold the holder clip 10' in place on a different thickness table with which the holder clip 10' is intended to be used.

Figure 10:
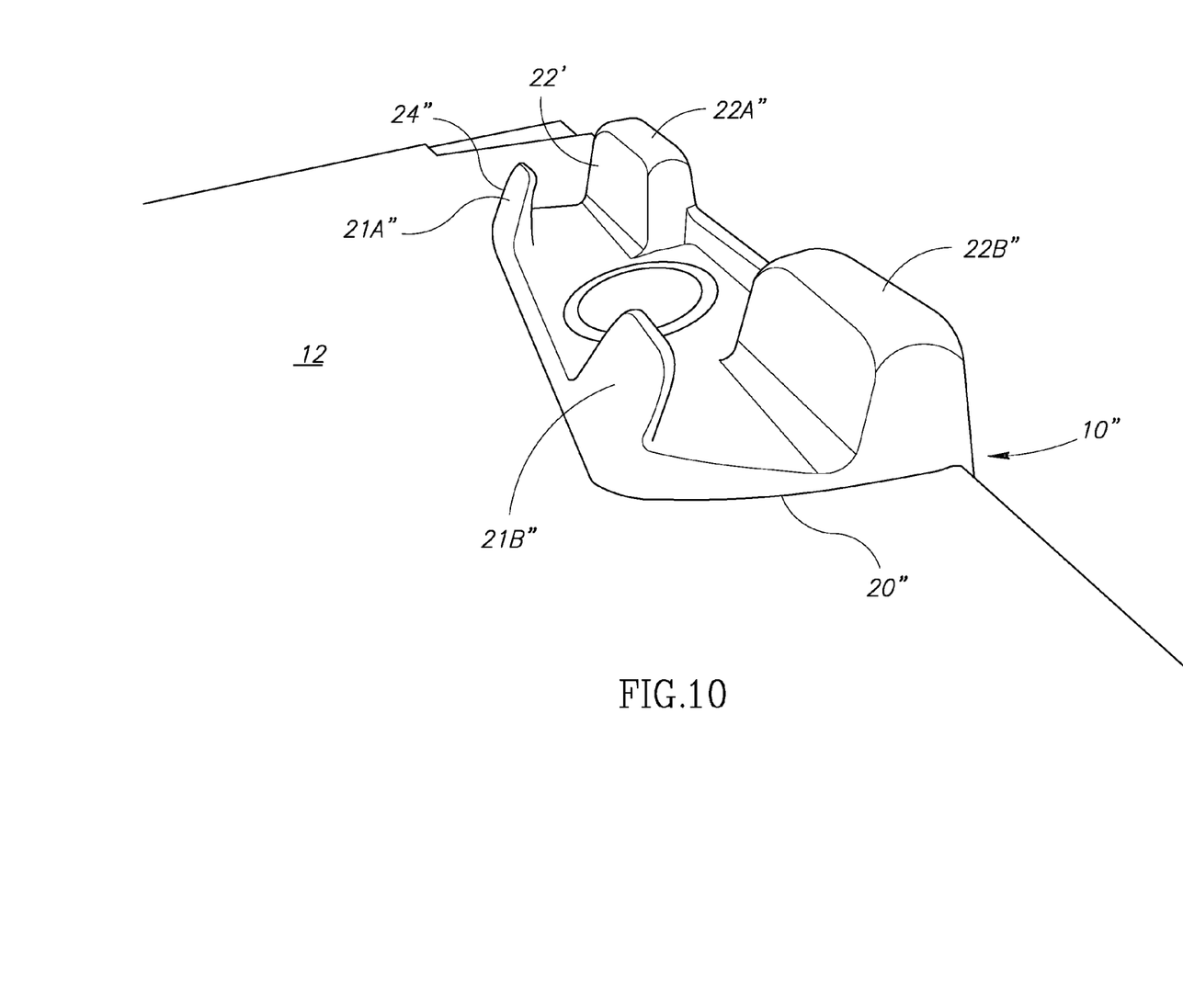
FIG. 10 illustrates a right side perspective view of a mobile device holder clip attached to a conventional tray table according to a third embodiment.
Figure 11:
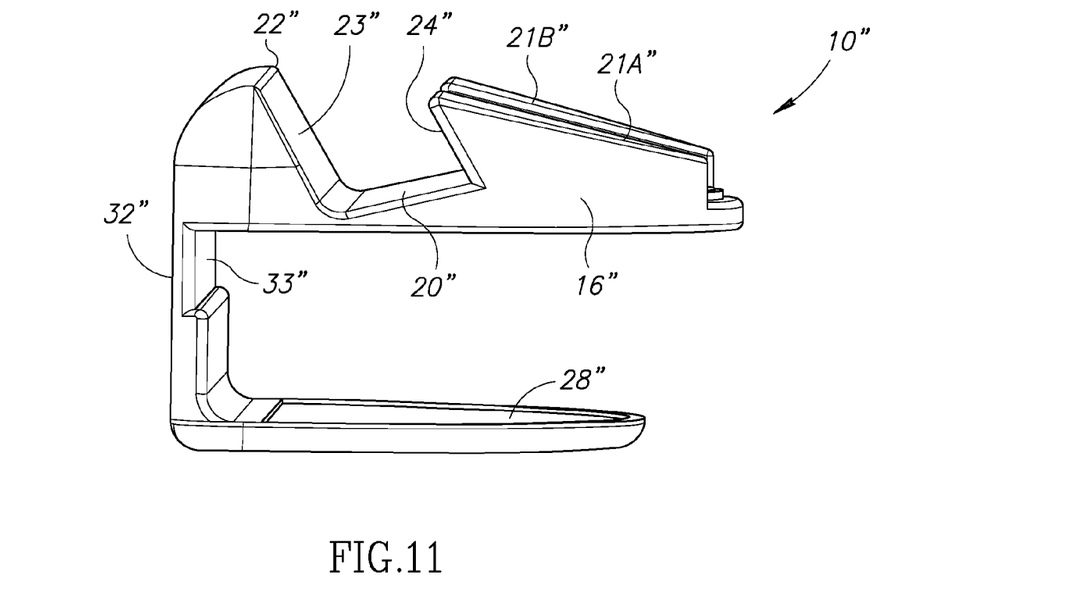
FIG. 11 illustrates a side view of the mobile device holder clip of FIG. 7.

FIGS. 10 and 11 show a second alternative embodiment of a removable table computer holder clip 10" that may be used with a conventional table 12 such as an aircraft tray table. The holder clip 10" has a similar construction as described above for the first alternative embodiment holder clip except that the base portion 16" may have laterally spaced-apart support portions. Specifically, a first front support portion 21A and a second front support portion 21B each having a front stop wall 24" may be laterally spaced apart on left and right front sides of the base portion 16". The back support member 22" may have a first rear support portion 22A" and a second rear support portion 22B" each having a rear stop wall 23" may be laterally spaced apart on a rear side of the base portion 16" (see FIG. 11). An upper surface on the base portion 16" may include a flat surface for displaying advertisements or logos.

Figure 12:
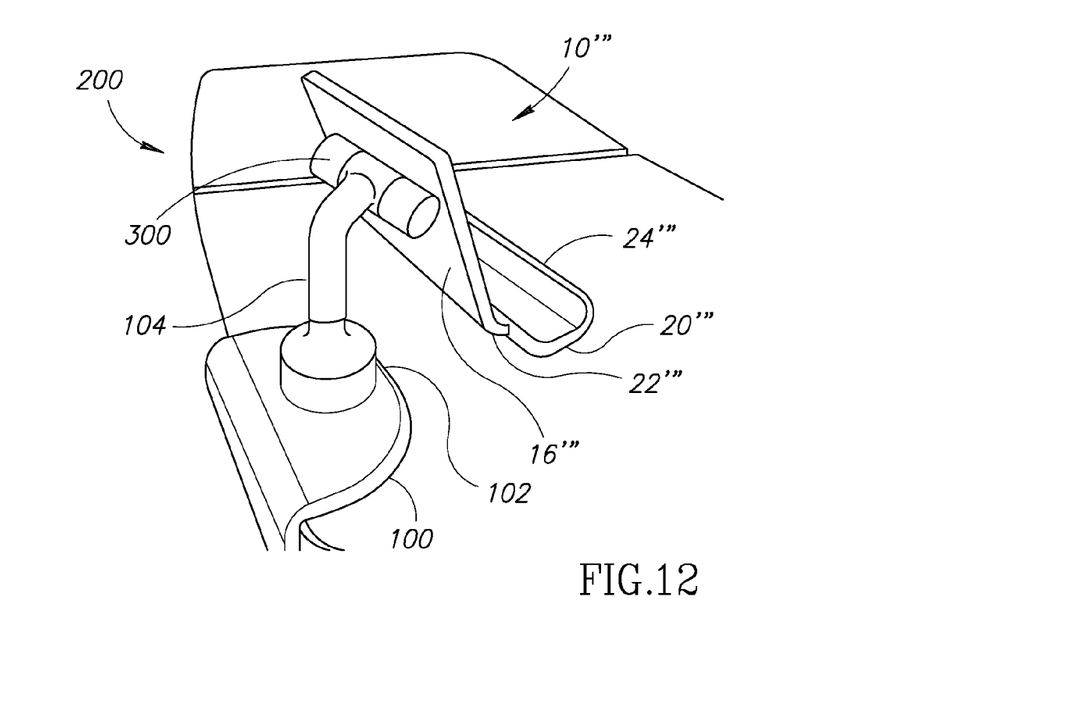
FIG. 12 illustrates a top rear perspective view of a mobile device holder clip attached to a conventional tray table according to a fourth embodiment.
Figure 13:
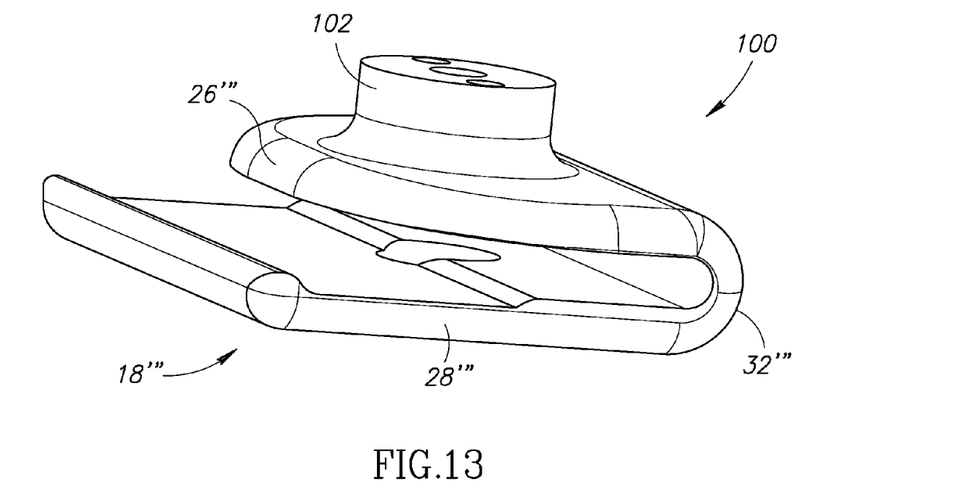
FIG. 13 illustrates a side perspective view of a clip portion of FIG. 12.
Figure 14:
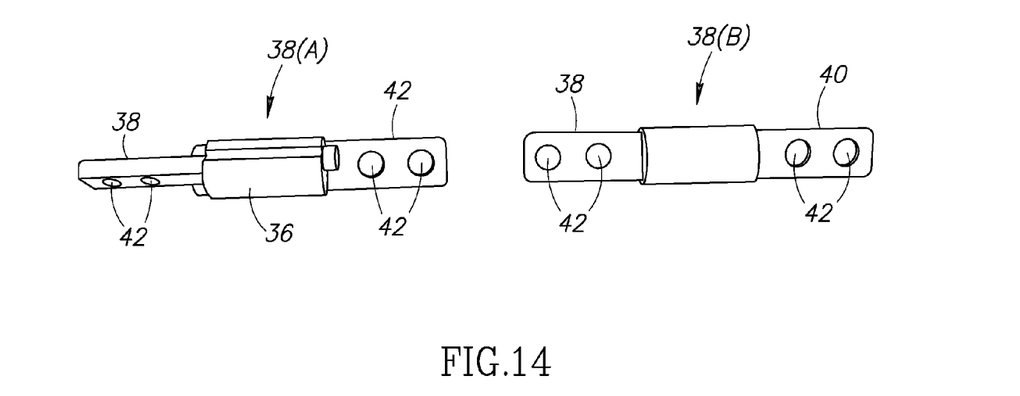
FIG. 14 illustrates a first hinge portion and a second hinge portion of the mobile device holder clip of FIG. 1.

FIGS. 12, 13 and 14 show a third alternative embodiment of a removable table computer holder clip 10'''. As best shown in FIG. 13, in this embodiment the clip portion of the holder clip 10''' is formed as a lower component 100 to which an upper component 200 is pivotally connected. The upper component 200 may include a support tray 20''' upon which an edge of the tablet computer 14 rests, a back support member 22''' with a planar forward surface 23''' extending upwardly from a rearward edge portion of the support tray and against which the tablet computer leans. A front stop wall 24''' extending upwardly from a forward edge portion of the support tray 20''' limits forward movement of the portion of the table computer being supported by the support tray, such as used in the embodiment of FIG. 12.

The upper component 200 may be mounted to the lower component 100 for pivotal movement about an upright or vertical axis of rotation for allowing the upper component and hence the tablet computer it supports to be rotated to a desired viewing position. The support tray 20''' may be mounted to allow forward and backward rotation about a horizontal axis of rotation using one or more hinges to allow the upper component and hence the table computer it supports to be tilted to a desired display screen viewing angle. The lower component 100 includes an upwardly projecting mounting portion 102 to which the upper component 200 is pivotally connected for selected rotation about an upright axis of rotation for allowing the upper component and hence the tablet computer it supports to be rotated to a desired rotational position.

The upper component 200 and the lower component 100 may be connected together by a connecting member 104 connecting a lower or rear portion of the base portion 16''' and the mounting portion 102. The connecting member 104 and/or the mounting portion 102 may contain rotational mechanisms, such as bearings or swivels, for allowing rotation of the upper component 200 relative to the lower component 100.

The upper component 200 may include a rotational member allowing tilting of the upper component relative to the lower component 100 and hence tilting of the attached mobile device. In the present embodiment, a friction hinge 300 is integrated into the holder clip 10''' between the connecting member 104 and the rear surface of the support tray 20''' to accomplish the tilting action. This style hinge may be used in other embodiment of the holder clip where tilting is desired, such as in lieu of the two metal hinges 34 described above.

Figure 15:
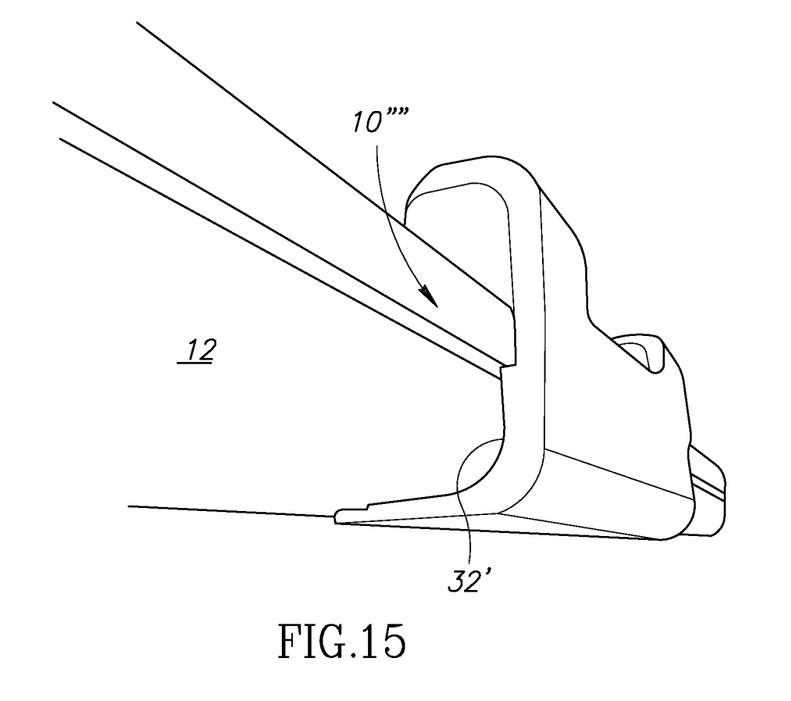
FIG. 15 illustrates a rear view of the mobile device holder clip of FIG. 1 attached to a conventional tray table.

The above embodiments may be modified without departing from the scope of the holder clip described herein. By way of non-limiting example, the rear wall member 32 of the holder clip 10 may be shaped to conform to the edge shape of the table 12, as shown in FIG. 15. The rear wall member 32''' may have a curved shape connecting an upper member 26''' and a lower member 28''' to facilitate the clip portion 18''' to adapt to different table 12 shapes (see FIG. 13). The base portion 16' may have a tapered shape that tapers or narrows from the support tray 20' toward a front side of the base portion (see FIGS. 7, 8 and 9).

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

What is claimed is:

1. A holding clip apparatus for attaching a mobile electronic device to a tray table, the holding clip apparatus comprising:
   a tray table attachment portion including
      a first rear support wall extending in a first direction,
      a lower support member extending from a lower end of the first rear support wall in a second direction transverse to the first direction, and
      an upper support member extending from an upper end of the first rear support wall in the second direction, the upper support member including an upper support member end portion having a transversely extending lower surface facing the lower support member, and a first attachment portion; and
   a mobile device holding portion including
      a base portion having an upwardly facing support surface extending in the second direction and having a second attachment portion configured to attach to the first attachment portion,
      a front support wall extending upwardly from a front side of the support surface, and
      a second rear support wall extending upwardly from a rear side of the support surface, the second rear support wall having a greater height than the front support wall,
   the mobile device holding portion being configured to rotate relative to the tray table attachment portion about an axis of rotation transverse to the first direction and the second direction.

2. The holding clip apparatus of claim 1, wherein the lower support member of the tray table attachment portion has a first length in the second direction, the upper support member has a second length in the second direction, and the first length is greater than the second length.

3. The holding clip apparatus of claim 1, wherein the mobile device holding portion has a first width in a third direction, the tray table attachment portion has a second width in the third direction, and the second width is greater than the first width.

4. The holding clip apparatus of claim 1, wherein the second rear support wall has a planar shape and a width extending in a third direction.

5. The holding clip apparatus of claim 1, wherein the lower support member has a curved shape curving toward the upper support member.

6. The holding clip apparatus of claim 1, wherein the first attachment portion and the second attachment portion are complementary hinge portions.

7. The holding clip apparatus of claim 1, wherein the lower support member of the tray table attachment portion comprises a first support arm and a second support arm, each extending in the first direction, the second support arm being laterally spaced apart from the first support arm in a third direction transverse to the second direction.

8. A holding clip apparatus for attaching a mobile electronic device to a tray table, the holding clip apparatus comprising:
- a base portion extending in a forward direction and having lower tray engagement surface, and an upper facing device support surface and forward and rearward end portions;
- a forward device support portion extending upwardly from the forward end portion of the base portion;
- a rearward device support portion extending upwardly from the rearward end portion of the base portion;
- a lower coupling member having an upper tray engagement surface spaced apart from the lower tray engagement surface of the base portion to receive the tray table therebetween; and
- a rearward coupling member extending between a rearward end portion of the base portion and the lower coupling member.

9. The holding clip apparatus of claim 8, wherein the rearward device support portion of the base portion extends at a first acute angle with respect to the upper facing device support surface of the base portion.

10. The holding clip apparatus of claim 8, wherein the forward device support portion of the base portion extends at a second acute angle with respect to the upper facing device support surface of the base portion.

11. The holding clip apparatus of claim 10, wherein the first acute angle is equal to the second acute angle.

12. The holding clip apparatus of claim 11, wherein the forward device support portion of the base portion has a first length, the rearward device support portion has a second length, and the second length is greater than the first length.

13. The holding clip apparatus of claim 8, wherein the forward device support portion of the base portion is rearwardly angled.

14. The holding clip apparatus of claim 8, wherein the rearward device support portion of the base portion has a first portion with a first thickness and a second portion with a second thickness, the first thickness being less than the second thickness.

15. The holding clip apparatus of claim 14, wherein the first portion is above the second portion.

16. The holding clip apparatus of claim 8, wherein the upper tray engagement surface of the lower coupling member and the lower tray engagement surface of the base portion extend in the forward direction.

17. The holding clip apparatus of claim 8, wherein the lower tray engagement surface of the base portion has a first length in the forward direction, the upper tray engagement surface of the lower coupling member has a second length in the forward direction, and the first length is greater than the second length.

18. A holding clip apparatus for attaching a mobile electronic device to a tray table, the holding clip apparatus comprising:
- a mobile device support portion including:
  - a forwardly extending base support member having an upwardly facing device support surface, and forward and rearward end portions,
  - an upwardly extending rear support at the rearward end portion of the base support member,
  - an upwardly extending front support at the forward end portion of the base support member;
- a tray table attachment portion for removably attaching the holding clip apparatus to the tray table, the tray table attachment portion including:
  - a forwardly extending upper support member having a lower tray engagement portion and a rearward end portion,
  - a forwardly extending lower support member having an upper tray engagement portion and a rearward end portion, and
  - a rearward member extending between the rearward end portion of the upper support member and the rearward end portion of the lower support member;
- a rotation portion rotatably connecting the mobile device support portion to the tray table attachment portion and allowing the mobile device support portion to rotate relative to the tray table attachment portion about an upwardly oriented axis of rotation.

19. The holding clip apparatus of claim 18, wherein the rotation section has an upper attachment portion attached to one of the base portion and the rear support of the mobile device support portion and a lower attachment portion attached to one of the upper support member and rearward member of the tray table attachment portion.

20. The holding clip apparatus of claim 18, wherein the rotation portion extends upwardly from the tray table attachment portion along the upwardly oriented axis of rotation.

21. The holding clip apparatus of claim 18, further comprising a second rotation portion connecting the mobile device support portion to the tray table attachment portion and allowing the mobile device support portion to rotate relative to the tray table attachment portion about a laterally oriented axis of rotation.

22. The holding clip apparatus of claim 21, wherein the second rotation portion has an upper attachment portion attached to one of the base portion and the rear support of the device support portion and a lower attachment portion attached to one of the upper support member and the rearward member of the tray table attachment portion.

23. The holding clip apparatus of claim 21, wherein the second rotational portion is a horizontally oriented hinge mechanism.

24. A holding clip apparatus for attaching a mobile electronic device to a tray table, the holding clip apparatus comprising:
- a mobile device support portion including:
  - a forwardly extending base support member having an upwardly facing device support surface, and forward and rearward end portions,
  - an upwardly extending rear support at the rearward end portion of the base support member,
  - an upwardly extending front support at the forward end portion of the base support member;
- a tray table attachment portion for removably attaching the holding clip apparatus to the tray table, the tray table attachment portion including:

a forwardly extending upper support member having a lower tray engagement portion and a rearward end portion,
a forwardly extending lower support member having an upper tray engagement portion and a rearward end portion, and
a rearward member extending between the rearward end portion of the upper support member and the rearward end portion of the lower support member;
a rotation portion rotatably connecting the mobile device support portion to the tray table attachment portion and allowing the mobile device support portion to rotate relative to the tray table attachment portion about a laterally oriented axis of rotation.

* * * * *